FREQUENCY TRACKING SYSTEM

Filed Dec. 13, 1957 4 Sheets-Sheet 1

INVENTOR
B. M. WOJCIECHOWSKI
BY Patrick J. Roche
ATTORNEY

INVENTOR
B. M. WOJCIECHOWSKI
BY Patrick J. Roche
ATTORNEY

INVENTOR
B. M. WOJCIECHOWSKI
BY Patrick J. Roche
ATTORNEY

Aug. 15, 1961 B. M. WOJCIECHOWSKI 2,996,684

FREQUENCY TRACKING SYSTEM

Filed Dec. 13, 1957 4 Sheets-Sheet 4

INVENTOR
B. M. WOJCIECHOWSKI

BY Patrick J. Roche
ATTORNEY

United States Patent Office 2,996,684

Patented Aug. 15, 1961

2,996,684

FREQUENCY TRACKING SYSTEM

Bogumil M. Wojciechowski, New York, N.Y., assignor to Bell Telephone Laboratories, Incorporated, New York, N.Y., a corporation of New York Filed Dec. 13, 1957, Ser. No. 702,651
3 Claims. (Cl. 331—38)

This invention relates to a system for precision tracking of two alternating current signal frequencies at a constant frequency difference interval, and more specifically to such a system in which a master frequency constituting one of the two signal frequencies is subject to rapid frequency variations and drifts. This is a further development of the decade oscillator system disclosed in my Patent No. 2,745,962, issued May 15, 1956.

In electronic measuring techniques related to frequency generation, adjustment and interpolation, need often arises for adding or subtracting two alternating-current signal frequencies. When the ratio between the two frequencies to be combined is not high, say less than 100 to 1, the sum and difference products resulting from the inter-modulation of these two frequencies in a modulator can readily be separated by an electric wave filter of a standard design. However, when the ratio between two such frequencies increases beyond 100 to 1, the problem of designing an appropriate single filter network to separate the sum and difference products becomes more and more difficult and eventually becomes impracticable at and beyond certain ratios.

So-called "slave-oscillator" systems employing servomechanisms and reactance-tube frequency control circuits for frequency tracking have been heretofore devised. These systems perform satisfactorily when the master frequency is not subject to rapid frequency variations and drifts. However, whenever these variations occur rapidly, the inherent mechanical and electric inertia of these systems tend to produce instantaneous tracking errors and, provided the variations are large enough, may result in loss of tracking between the master and slave frequencies. In the further event that these variations tend to exceed the desired tracking frequency, tracking becomes impossible. The present invention contemplates a system for adding or subtracting two signals, irrespective of the frequency ratio therebetween, with the aid of filters of standard design.

It is accordingly an object of the present invention to add or subtract two frequencies of such high ratio therebetween as to preclude the separation of sidebands thereof with an electric wave filter of practical design by conventional techniques.

It is a further object of this invention to track precisely two frequencies without the use of servomechanisms by all-electronic means.

It is a still further object of this invention to generate a slave frequency output at a constant frequency interval from a master frequency source subject to random frequency variations which may exceed the desired frequency interval.

It is another object of this invention to track an adjustable frequency master source at a constant frequency interval.

It is yet another object of this invention to track precisely a given master frequency signal by a slave frequency signal with relatively inexpensive apparatus.

Broadly, the invention comprises a system for combining two main alternating-current signals having frequencies widely spaced on the frequency scale and selecting the upper or lower sideband product of these two main frequencies by the use of one or more auxiliary signals havig frequencies intermediate the two main frequencies. The one or more auxiliary signals are initially added to or subtracted from the two main signals and subsequently subtracted from or added to intermediate sideband products of the main and auxiliary signals in a plurality of modulator-fixed filter elements. The auxiliary signal frequencies are so chosen that the frequency ratio between each pair of signals applied to a modulator-filter element is sufficiently low so that either sideband produced in the modulator can be separated from the other in an associated filter having ordinary frequency-discriminating characteristics. Each of the auxiliary signals is added to or substracted from the main signals at one frequency level and then is subtracted or added at another level with the result that the auxiliary signals are eliminated and their drifts do not appear in the output signal.

Each modulator-filter element comprises a conventional non-linear modulator having two input points and an output point and a filter of fixed transmission characteristics, usually either high-pass or low-pass, connected to the output of the modulator.

The system of the invention is applicable to the combining of two high-ratio frequencies with an accuracy determined solely by the stability of the main frequencies; to the tracking of a fixed master frequency signal by a slave signal at a predetermined difference frequency; to the tracking of an adjustable master frequency signal by a slave signal at a predetermind small constant difference frequency; and to a digital frequency combining and selecting system.

Symbolic analytical diagrams are developed as an aid in choosing for a given application the required minimum number of auxiliary signals and modulator-filter elements, filter characteristics, and number and location of combining points.

A significant feature of the invention is that the precision of the output signal is determined solely by the stability of the main signals and is independent of random drifts and other frequency variations of the auxiliary signals. In servomechanism systems which produce similar results, the stability of the system is inherently limited by mechanical and electrical inertia and backlash and further by the fact that a finite error signal is always necessary to maintain the system in synchronism. There are no error signals or feedback loops in the system of the invention.

Another feature is high reliability and freedom from maintenance difficulties.

These and other objects and features of the invention will be better understood from the following description of specific embodiments shown in the several figures of the drawing in which.

Figure 1A:
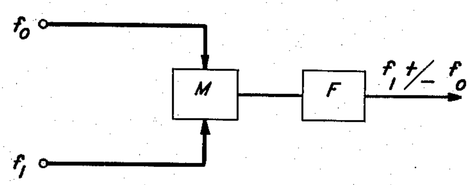
FIGS. 1A and 1B are block and symbolic diagrams, respectively, of an elementary modulator-fixed filter element.

FIG. 1A represents in block form an elementary frequency combining scheme. Block M indicates a nonlinear modulator of a conventional type such, for example, as a varistor modulator commonly employed in carrier telephone terminal apparatus and disclosed in F. A. Cowan Patents Nos. 1,959,459 and 2,025,158, issued May 22, 1934, and December 24, 1935, respectively. Two input points and one output point are shown. At one of the input points a signal of frequency $f_0$ is applied, and at the other a signal $f_1$ is applied. It is desired to obtain an output signal of a frequency equal to either the sum or the difference of the two input frequencies $f_1$ and $f_0$. Intermodulating the frequencies $f_1$ and $f_0$, assuming frequency $f_1$ to be the higher frequency, produces an output containing the principal sidebands $f_1+f_0$ and $f_1-f_0$.

In order to effect a positive selection of either the upper or lower sideband of the two input frequencies $f_1$ and $f_0$, a filter F is connected to the output of the modulator M. According to whether the upper or lower sideband is desired as an output, a high-pass or low-pass filter of any well-known type is employed. In either case the cut-off frequency for the filter F must lie just above or just below the higher of the two input frequencies ($f_1$ in this case). If the ratio between the input frequencies $f_1$ and $f_0$ is 10 to 1 or less, there is no obstacle in the realm of practicability for designing and building a filter F containing resistive, capacitive and inductive elements only. If the ratio between these input frequencies is of the order of 100 to 1 or slightly greater, crystal filters of an available design may be used as filter F. However, if the ratio between the input frequencies approaches or exceeds 1000 to 1, no practicalble filter of economical design is available to serve as filter F and the respective sidebands can no longer be separated by practicable filters from the higher of the two input frequencies.

It is the object, nevertheless, of this invention to separate the sidebands of two signals of a high-ratio frequency difference by the use of conventional filters of practical design. As an aid to a better understanding of the principle of the invention to be described more fully below, a few simple propositions, which may be called the rules of "sideband algebra," will now be outlined.

Two numerical quantities $f_1$ and $f_0$, assuming that $f_1$ is greater than $f_0$, each representing the fundamental frequency of a discrete alternating-current signal source, can be numerically added, or the lesser substracted from the greater, only if the following condition is met: viz., that the ratio $$\frac{f_1}{f_0} \leqq n \qquad (1)$$

where $n$ represents the highest ratio of two frequencies, and either the upper or lower sideband can be separated from undesired modulation products by use of an electrical wave filter F of a given practical design.

The operation of frequency addition or subtraction is called here, "frequency combining." It can be expressed by the equation $$f_1 +/- f_0 = f_c \qquad (2)$$

where the symbol "+/−" is intended to be read: "plus or minus" or "upper or lower sideband"; and $f_c$ is the combined frequency.

Figure 1B:
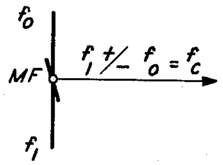

The elementary frequency-combining arrangement shown in FIG. 1A, as previously discussed, may be represented symbolically in FIG. 1B. In the symbolic diagram the small circle designated MF represents a junction point at which is located a modulator-fixed filter element as already described in regard to FIG. 1A. Each signal source frequency is represented by a heavy-weight line and its direction of application with respect to a modulator-filter element is indicated by the half arrowhead. Other frequencies resulting from the combining of two source frequencies are represented by the lighter-weight straight line. In FIG. 1B the discrete source frequencies are designated $f_0$ and $f_1$ on the heavy-weight lines each of which has a half arrowhead directed toward the small circle designated MF. The light-weight line represents the output signal frequency, which may be the upper or lower sideband of $f_1$ and $f_0$ depending on whether the MF junction includes a high or a low-pass filter F in FIG. 1A. The light-weight line therefore bears a full arrowhead directed away from the junction point MF and is identified as $f_c=f_1+/-f_0$.

In the development of arrangements for utilizing the principles of this invention, it is assumed that the inherent drifts of the two primary frequencies $f_1$ and $f_0$ to be added or subtracted are the only tolerable frequency deviations permissible in the desired upper or lower sideband of these two frequencies. Whenever the ratio $n$ of two frequencies to be combined exceeds the discrimination capabilities of practical filters, a certain number of auxiliary frequencies is introduced into the frequency-combining system. The instantaneous value of any of these auxiliary frequencies may be considered as the algebraic sum of a nominally predetermined value and a drift component containing phase and frequency variations. Therefore, these auxiliary frequencies with their associated drifts when once introduced into a frequency-combining system can be canceled only by elimination of the very same frequencies including the drifts associated therewith.

This invention deals with systems for combining two primary frequencies with the aid of auxiliary frequencies which are employed at numerical frequency levels intermediate those of the primary frequencies in order to make use of standard filter elements and which are cancelled with their associated drifts from the system before the ultimate sideband product is obtained. The role of the auxiliary frequencies may be likened to catalysts in certain chemical reactions. These frequencies are utilized at certain intermediate combining stages in the system but do not appear in the final product and are not used up in the process.

The elimination of the auxiliary frequencies is accomplished in a chosen sequence of upper and lower sideband combinations, and to facilitate the choosing of the sequence the following rules are set forth:

(*a*) It is assumed that the frequency of any primary signal source (an oscillator, for example) has a positive sign; and (*b*) When combining two single-sideband frequencies the higher of them (with the original component frequencies) does not change its sign; the lower of the two frequencies (with the original component frequencies) retains its sign in the upper sideband, but reverses it (with the original component frequencies) in the lower sideband.

Assume that the ratio between two primary frequencies $f_k$ and $f_0$ is $$\frac{f_k}{f_0} \leqq n^k \quad (3)$$

where $$n = k\sqrt{n_1 n_2 \ldots n_k} \quad (4)$$

and $n_1, n_2 \ldots n_k$ represent frequency ratios as set forth in Equation 1 for several intermediate frequency levels at which practical filter designs are available. The integer $k$ may be taken to represent the minimum number of modulation stages required to obtain a single sideband combination of primary signal frequencies, approximately at a $f_k$ level with a low signal frequency $f_0$.

The symbol $n$, while representing here a frequency-ratio constant as defined in Equation 1, may also be related to the discrimination capabilities of a given electric wave filter. For example, an electric wave filter having an attenuation characteristic such that a frequency but 10 percent removed from the nominal frequency at the point of minimum attenuation (for a band-pass filter) is suppressed sufficiently for practical uses may be said to have an $n$-value of 10. Similarly, a filter capable of suppressing a frequency 1 percent removed from the center frequency of a band-pass filter may be assigned an $n$-value of 100. Low- and high-pass filters may be characterized in a similar manner.

Figure 5:
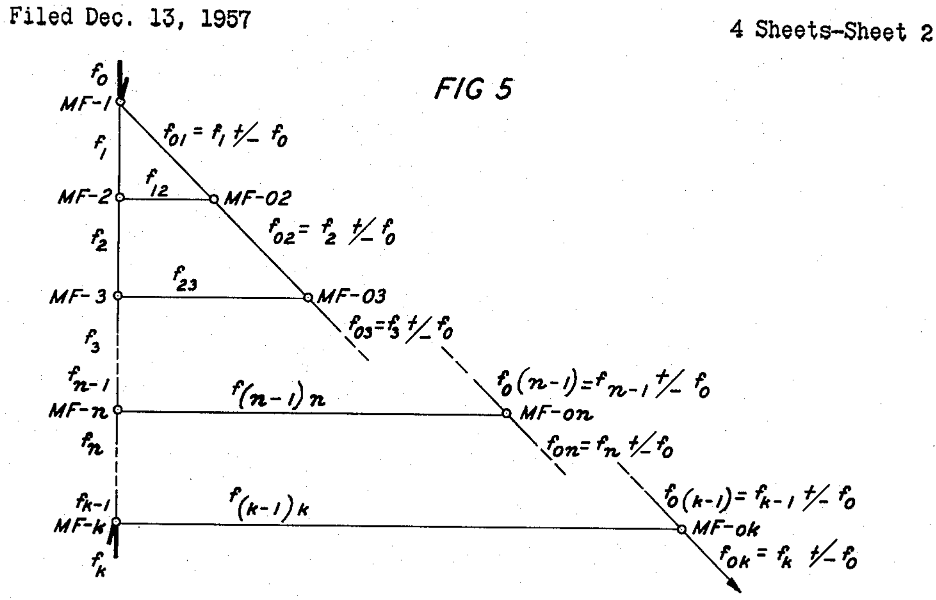
FIG. 5 is a symbolic diagram for the general solution of the problem of combining two main signals regardless of frequency ratio therebetween in accordance with the invention.

Assume that the symbolic diagram of FIG. 5 represents the general system of frequency combining in accordance with this invention. On this diagram each frequency within the system is represented by a line without regard to any scale and each junction point at which three such lines intersect is represented by a small circle. Each junction point represents an elementary modulator filter element discussed above in connection with FIG. 1A. Each of the three frequencies incident at any of the junction points of FIG. 5 must meet the requirements of Equations 1 and 2.

If the number of junction points interposed between the primary frequencies $f_0$ and $f_k$ is taken as $k$, the minimum number of frequency combining stages, then from the geometry of the network shown in FIG. 5, the number $m_a$ of intermediate auxiliary frequencies to be introduced into the system can be found by inspection to be $$m_a = k - 1 \quad (5)$$

Similarly, the total number $m_j$ of junction points in the network can be found as $$m_j = 2k - 1 \quad (6)$$

If $k$ is eliminated between Equations 5 and 6 the number of junction points $m_j$ may be expressed as a function of the number of auxiliary frequencies $m_a$. Thus, $$m_j = 2m_a + 1 \quad (6a)$$

It may be noted on FIG. 5 that all but three lines, representing frequencies, are intercepted between two junction points. The number $m_b$ of these frequencies may be found as $$m_b = 3(k-1) \quad (7)$$

The three lines not thus intercepted are the two primary frequencies and the desired output frequency. The lines intercepted between junction points are either auxiliary frequencies or frequencies derived from the primary frequencies and the chosen auxiliary frequencies. Each junction point is designated numerically with an MF prefix.

The system of connecting bilaterally all auxiliary frequencies and their combinations makes possible the eventual cancellation of all auxiliary frequencies from the network output. Each primary frequency, on the other hand, is connected to but a single junction-point and each is represented by a unilateral line having only a half arrowhead. At the output junction-point the desired single-sideband combination contains only components derived from the primary frequencies.

Between the input points MF–1 and MF–$k$ in FIG. 5 to which the primary frequencies $f_0$ and $f_k$, respectively, are connected, a number equal to $m_a$ (Equation 5) of signal source frequencies $f_1, f_2 \ldots, f_{k-1}$ are interposed, connecting successively a number equal to $k$ junction-points MF–1, MF–2 . . . MF–$k$. Each successive pair of these frequencies must meet the requirement of Equation 1, so that $$\frac{f_1}{f_0} \leqq n_1; \frac{f_2}{f_1} \leqq n_2; \ldots; \frac{f_k}{f_{k-1}} \leqq n_k \quad (8)$$

where $n_1, n_2, \ldots, n_k$ are defined by Equation 4.

Each of the third frequencies $f_{12}, f_{23}, \ldots, f_{(k-1)k}$, converging at junction-points MF–2, MF–3, . . ., MF–$(k-1)$ represent frequencies complementary to the remaining two frequencies thereat incident.

Thus $$f_{12} = f_2 +/- f_1 \quad (9.1)$$

$$f_{23} = f_3 +/- f_2 \quad (9.2)$$

$$f_{(k-1)k} = f_k +/- f_{(k-1)} \quad (9.3)$$

In like manner the third frequency incident at the MF–1 junction-point is found as $$f_{01} = f_1 +/- f_0 \quad (10)$$

Examination of Equations 9.1 and 10 shows that both frequencies $f_{12}$ and $f_{01}$ contain the common frequency component $f_1$. From a comparison of Equations 8, 9.1 and 10 it can be determined that $$\frac{f_{12}}{f_{01}} = n_1 \frac{n_2 +/- 1}{n_1 +/- 1} \quad (11)$$

Assuming that $n_1$ and $n_2$ are large in comparison with unity, $$\frac{f_{12}}{f_{01}} \cong n_2 \quad (12)$$

Therefore the ratio $n_2$ for $f_{12}/f_{01}$ is the same as that for $f_2/f_1$. It can be concluded then that $f_{12}$ and $f_{01}$ frequencies can be combined at junction point MF–02 by using an electric wave filter of a design similar to that used at junction point MF–2. The auxiliary frequency $f_1$ introduced at junction point MF–2 can be eliminated from the frequency $f_{02}$ at the MF–02 junction by the expedient of choosing proper sideband combinations at junction points MF–1, MF–2 and MF–02.

The necessary condition for accomplishing this result is that the sign of the $f_1$ frequency component in Equation 9.1 be opposite to that of the same component in Equation 10 when the upper sideband at the MF–02 junction point is selected or that the signs be the same when the lower sideband at the MF–02 junction is selected.

This is illustrated as follows:

If $$f_{12} = f_2 - f_1$$

and $$f_{01} = f_1 +/- f_0$$

then $$f_{02} = f_{12} + f_{01} = f_2 +/- f_0$$

If, on the other hand, $$f_{12} = f_2 + f_1$$

and $$f_{01} = f_1 +/- f_0$$

then $$f_{02} = f_{12} - f_{01} = f_2 -/+ f_0$$

Proceeding in succession from junction points MF–02 to MF–03 . . . MF–0$n$ to MF–0$k$ in a similar manner, it can be proved that the frequencies $f_{01}, f_{02}, \ldots f_{0(k-1)}$ can each be obtained as single sideband combinations of the original low frequency $f_0$ and of the frequencies $f_1$, $f_2$, . . . $f_{k-1}$ in succession as shown on FIG. 5. Eventually, the frequency $f_{0k}$ emerging from the junction MF–0$k$ can be obtained as a single sideband combination of the two primary frequencies $f_0$ and $f_k$. Thus, at each pair of horizontally connected junction points, filters of similar design may be used in the manner of those used at the junctions MF–2 and MF–02 above mentioned.

The system represented by FIG. 5 provides a general solution to the problem of combining, in the form of a single sideband, two signal frequencies irrespective of numerical ratio therebetween by the use of electric wave filters of practical design. Further, FIG. 5 provides a solution using the minimum number of network elements within a given available filter discrimination capability.

The system of FIG. 5 is not limited, however, to cases where the auxiliary frequencies are represented by $f_1$, $f_2$ . . . $f_{(k-1)}$. Auxiliary frequencies can be represented as well by any one of the frequency-mesh branches $f_{12}$, $f_{23}$, . . . $f_{(k-1)k}$ or $f_{01}$, $f_{02}$ . . . $f_{0(k-1)}$, with the condition that the total number of auxiliary frequencies introduced is determined by Equation 5.

All other frequencies are derived from a given choice of auxiliary frequencies. Some frequencies in FIG. 5 may be considered independent design parameters within the limits of Equations 2 and 8. It may be found convenient to establish a priori the frequency-mesh network and then determine the junction-point terminations according to the following rules:

(1) The highest numerical value of the three frequencies incident at a single junction-point is equal to the sum of the absolute numerical values of the two other frequencies;

(2) If the highest numerical value of the three frequencies is an output frequency derived from an independent choice of the two lower frequencies, the given junction-point performs summation, that is, selects the upper sideband;

(3) If the highest of the three frequencies is an input frequency, the given junction-point performs subtraction, that is, selects the lower sideband.

To determine, therefore, a practical modulator-filter element represented by a junction-point, the absolute values of two of the three incident frequencies and the sense or direction (whether it is an input or an output frequency) of one of the three frequencies must be known.

Figure 2A:
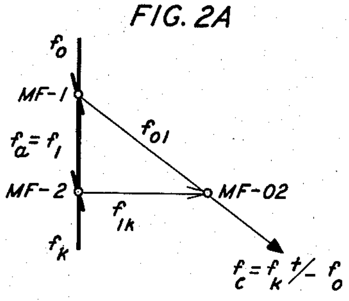
FIGS. 2A, 3A and 4A are symbolic diagrams showing the various modes of operation of systems in accordance with the invention which require a single auxiliary signal and three modulator-filter elements for combining two main signals.
Figure 2B:
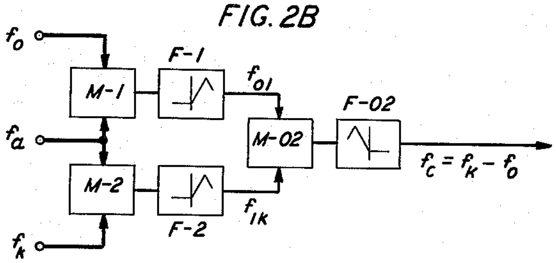
FIGS. 2B, 3B and 4B are block diagrams of operating systems derived from the corresponding symbolic diagrams of FIGS. 2A, 3A and 4A, respectively.
Figure 3A:
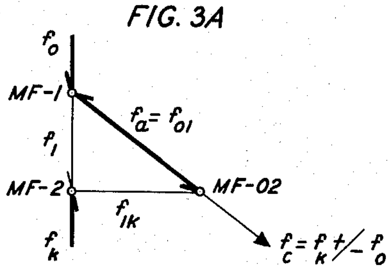
Figure 3B:
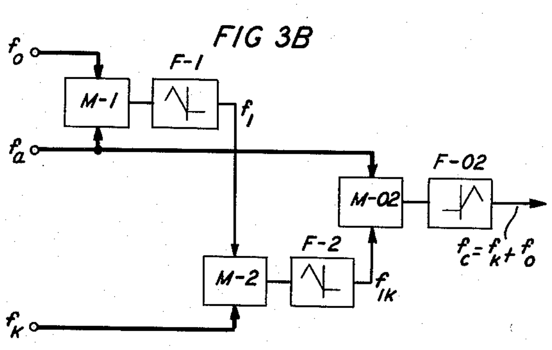
Figure 4A:
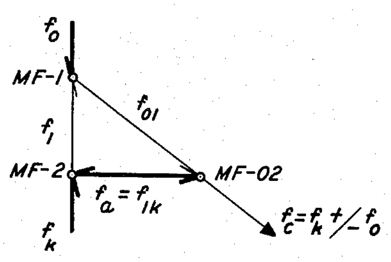
Figure 4B:
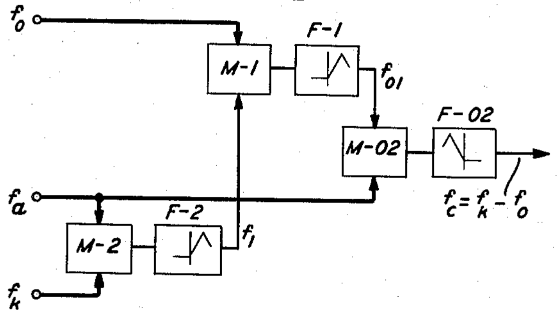

The versatility of the frequency-combining system in accordance with this invention is illustrated in the symbolic diagrams of FIGS. 2A, 3A and 4A, from which are derived the corresponding block diagrams of FIGS. 2B, 3B and 4B, respectively. Each of these diagrams illustrates a different mode of combining two primary frequencies $f_0$ and $f_k$ to obtain a single sideband output frequency using a single auxiliary frequency $f_a$. Just as the symbolic diagram of FIG. 1B may be considered a specific example of the general combining scheme in which the $k$-factor of Equation 3 is unity and the symbolic diagram of FIG. 5 is the general case, the symbolic diagrams of FIGS. 2A, 3A and 4A are specific examples of the case where $k=2$.

In FIG. 2A the auxiliary frequency $f_a$ is combined directly with the two primary frequencies $f_0$ and $f_k$, as represented by the heavy-weight vertical line $f_a=f_1$ having a half arrowhead on each end joining junction points MF–1 and MF–2. Diagonal line $f_{01}$ of light-weight represents a frequency derived from the combining of primary frequency $f_0$ and auxiliary frequency $f_a$ at junction-point MF–1. Horizontal line $f_{1k}$ of light-weight represents similarly a frequency derived from the combining of primary frequency $f_k$ and auxiliary frequency $f_a$ at junction point MF–2. The output or combined frequency $f_c$ is derived at junction-point MF–02 by combining derived frequencies $f_{01}$ and $f_{1k}$. Depending on whether high-or low-pass filters are used at the respective junction points, output frequency $f_c$ is the upper or lower sideband of the combined primary frequencies $f_0$ and $f_k$. The respective filter choices must be so made as to eliminate auxiliary frequency $f_a$ from the output $f_c$.

Assume that a low-pass filter is chosen at junction point MF–1, then the resultant frequency $$f_{01}=f_a-f_0$$

In order to obtain the lower sideband of the primary frequencies $f_0$ and $f_k$ at junction point MF–02 and at the same time cancel the auxiliary frequency, a high-pass filter must be chosen. Then $$f_c=f_k-f_a+f_a-f_0=f_k-f_0$$

FIG. 2B is the block diagram derived from this interpretation of the symbolic diagram of FIG. 2A. Primary frequency $f_0$ is combined with auxiliary frequency $f_a$ in modulator M–1 to produce $f_a+/-f_0$. Filter F–1 indicates a low-pass filter centered at frequency $f_a$ and produces in its output $f_{01}=f_a-f_0$. Auxiliary frequencies $f_a$ is also simultaneously combined in modulator M–2 with primary frequency $f_k$ to produce $f_k+/-f_a$. Filter F–2 is also a low-pass filter, but centered at frequency $f_k$. From the output of filter F–2 is obtained frequency $f_{1k}=f_k-f_a$. Derived frequencies $f_{01}$ and $f_{1k}$ are combined in modulator M–02 to produce $$(f_k-f_a)+/-(f_a-f_0)$$

Filter F–02 is chosen to cancel auxiliary frequency $f_a$ and therefore must be a high-pass filter centered at $f_k-f_a$. Then, output frequecy $f_c$ is the lower sideband of the primary frequencies $f_0$ and $f_k$. To provide a detailed working circuit based on the block diagram of FIG. 2B is well within the skill of one trained in the electronic arts, and is therefore not shown herein.

It is apparent that there are seven additional variations of the placement of the filters at junction-points MF–1, MF–2 and MF–02 on the symbolic diagram of FIG. 2A. Of the total of eight possible combinations four must be rejected for failure to provide cancellation of the auxiliary frequency $f_a$ at junction-point MF–02. Of the four valid combinations two produce the upper sideband and two produce the lower sideband of the primary frequencies. These eight combinations designated as mode A are summarized in Table 1 shown below. The possible combinations diagrammed in FIG. 2A may be designated mode A, and the valid combinations are identified as modes A–1, A–2, A–3 and A–4.

The diagram of FIG. 2A provides additional variations by rotating the placement of the auxiliary frequency $f_a$ to the $f_{01}$ diagonal and the $f_{1k}$ horizontal positions in the symbolic diagrams shown in FIGS. 3A and 4A, respectively. The placement of the auxiliary frequency $F_a$ at the diagonal position illustrated in FIG. 3A may be designated mode B and at the horizontal position in FIG. 4A may be designated mode C. The eight combinations designated by each of modes B and C are summarized in Table 1.

Four valid filter combinations, B–1, B–2, B–3 and B–4, are derived from the diagram FIG. 3A, one (mode B–1) for producing an output frequency $f_c$ comprising the upper sideband of the primary frequencies $f_0$ and $f_k$ being shown as a block diagram FIG. 3B, which is self-explanatory in the light of the discussion concerning FIG. 2B. Mode C of symbolic diagram FIG. 4A yields two valid combinations C–2 and C–3. In this mode, it was found that two filter combinations which were valid for modes A and B are rejected because only the lower sideband at junction-point MF–2 is acceptable in accordance with rule (3) given above. FIG. 4B illustrates in block diagram one of the made C arrangements (C–3) for producing the lower sideband of the primary frequencies $f_0$ and $f_k$.

Table 1 summarizes all possible combinations of a single auxiliary frequency with two primary frequencies $f_0$ and $f_k$ to produce the upper or lower sideband of the later frequencies. The plus sign indicates a high-pass filter selecting the upper sideband at a given junction-point and the minus sign indicates a low-pass filter selecting the lower sideband at such point in the respective modes previously identified.

| Mode | MF-1 | MF-2 | MF-02 | Output Combination of Primary Frequencies |
|---|---|---|---|---|
| A | + | + | + | invalid. |
| A-1 | + | + | − | difference. |
| A | + | − | − | invalid. |
| A-2 | + | − | + | sum. |
| A-3 | − | − | + | difference. |
| A | − | + | + | invalid. |
| A-4 | − | + | − | sum. |
| A | − | − | − | invalid. |
| B | + | + | + | Do. |
| B-1 | + | + | − | sum. |
| B | + | − | − | invalid. |
| B-2 | + | − | + | difference. |
| B-3 | − | − | + | sum. |
| B | − | + | + | invalid. |
| B-4 | − | + | − | difference. |
| B | − | − | − | invalid. |
| C | + | + | + | Do. |
| C | + | + | − | Do. |
| C | + | − | − | Do. |
| C-2 | + | − | + | sum. |
| C-3 | − | − | + | difference. |
| C | − | + | + | invalid. |
| C | − | + | − | Do. |
| C | − | − | − | Do. |

The foregoing table reveals five different circuit combinations for providing either the sum (modes A–2, A–4, B–1, B–3 or C–2) or the difference (modes A–1, A–3, B–2, B–4 or C–3) of two primary frequencies $f_o$ and $f_k$ for which the $k$-factor of Equation 3 is equal to 2. All of these combinations can be scanned quickly with the aid of the symbolic diagrams, FIGS. 2A, 3A and 4A, and the most practical arrangements such as those shown in FIGS. 2B, 3B and 4B, respectively, can be deduced within a given circuit element availability. On the basis of the considerations and rules discussed above, all practical combinations of networks having a $k$-factor higher than 2 can also be readily deduced.

Figure 6A:
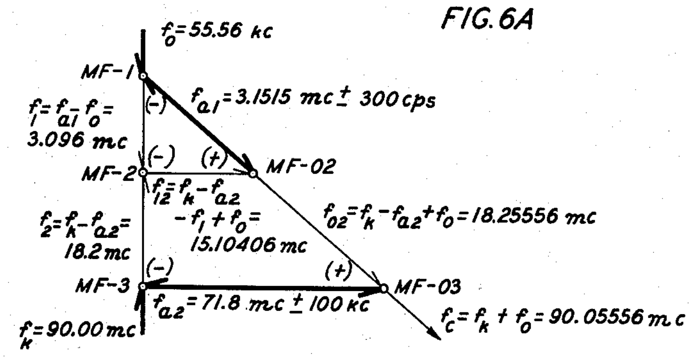
FIGS. 6A and 6B are symbolic and block diagrams, respectively, of a practical frequency tracking system for a fixed master frequency source in accordance with the invention.
Figure 6B:
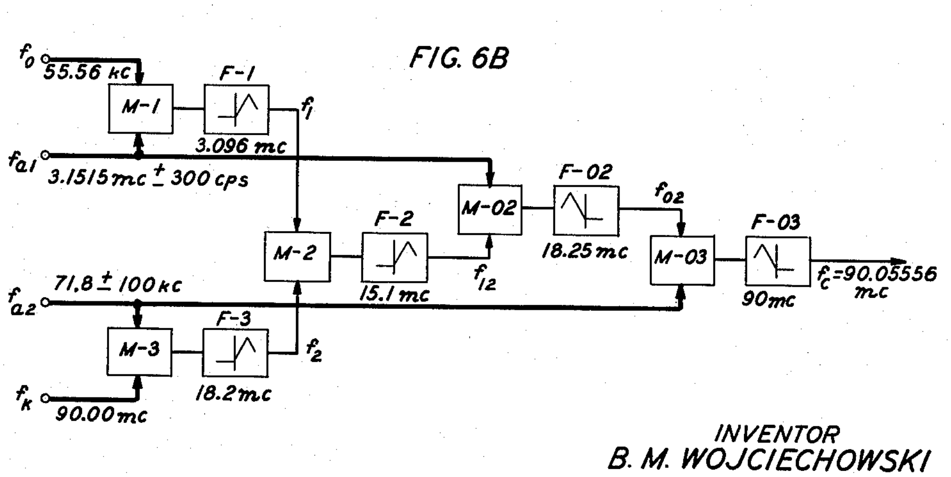

FIGS. 6A and 6B illustrate the numerical solution of a practical problem in accordance with this invention. FIGS. 6A and 6B may be conveniently taken as alternative representations of the same embodiment inasmuch as identical reference designators are used for corresponding elements. The following requirements are stated for a frequency tracking problem. A frequency $f_k$ of 90 megacycles with drifts and random frequency deviations of the order of ±1000 cycles per second is assumed to be the master source for the system. It is also assumed that some of the frequency deviations of master source $f_k$ may occur at a rate too rapid for a mechanical servomechanism system to follow without incurring excessive instantaneous tracking errors. A slave signal $f_c$ must be provided which is at all times higher than the master frequency by an increment of 55,560±10 cycles per second. In addition, any unwanted output signal components must be at least 60 decibels below the level of slave frequency $f_c$ level.

In the symbolic diagram of FIG. 6A, let $f_k$ be a master frequency of 90,000 kilocycles per second; $f_c$ be the slave frequency to be generated; and $f_0=f_k-f_c$ be the incremental difference frequency of 55.56 kilocycles per second.

From equation 3:

$$\frac{f_k}{f_0}=n^k=\frac{90000}{55.56}=1620$$

The following filters manufactured by the Western Electric Company and available from stock are considered:

(1) Type 560B having a pass-band of 3.096 megacycles±1000 cycles, and an $n$ value over 100.

(2) Type 526C having a pass-band at 15.1 megacycles±100 kilocycles and an $n$ value of about 10.

(3) Type 526D having a pass-band at 18.2 megacycles±100 kilocycles and an $n$ value of about 10. On the basis of the availability of these stock filters, a three-step frequency combining system is indicated. Therefore, $$n^k=n^3=n_1\times n_2\times n_3\cong 1620$$

and $$n_1=55,\ n_2=5,\ n_3=6$$

The number of intermediate auxiliary frequencies $m_a$ required is obtained from Equation 5 as $k-1=2$.

The number of junction-points $m_j$ is obtained from Equation 6 as $2k-1=5$.

The total number of network branches $m_b$ is obtained from Equation 7 as $3(k-1)=6$.

A symbolic diagram as in FIG. 6A is sketched and the available filters are placed therein as follows:

At junction-point MF–1 the 3.096 megacycle filter (560B);

At junction-points MF–3 and MF–02 the 18.2 megacycle filter (526D); and

At junction-point MF–2 the 15.1 megacycle filter (526C).

By locating an auxiliary frequency $f_{a1}$ at the diagonal position between junction-points MF–1 and MF–02 and choosing $f_{a1}$ equal to 3.1515 megacycles±300 cycles and locating another auxiliary frequency $f_{a2}$ at the horizontal position between junction-points MF–3 and MF–03 and choosing $f_{a2}$ equal to 71.8 megacycles±100 kilocycles, all the other derived frequencies can be found according to the rules give above.

Only one filter of a non-stock type is required for use at junction-point MF–03. An inspection of the symbolic diagram of FIG. 6A shows that such filter needs to pass 90 megacycles approximately while rejecting 52.6 megacycles. The design feature of this filter is well within practical limitations of the art and is readily fabricated by one skilled therein. Advantage can also be taken of this filter for the partial suppression of some of the unwanted modulation products by balancing them out in the modulator stage.

FIG. 6A indicates the numerical value of the auxiliary frequencies $f_{a1}$ and $f_{a2}$ and also indicates in equation form the components of the derived frequencies. The plus and minus signs at each junction-point indicate respectively whether a high-pass or a low-pass filter is required. FIG. 6B is the conventional block diagram obtained directly from the symbolic diagram of FIG. 6A in the manner explained in detail above in connection with FIGS 1A, 1B and 2B. Implementation of this diagram into a practical circuit is within conventional electronic circuit techniques by one skilled in the art. It may be noted that each of the auxiliary frequency signals is applied to two modulator stages, whereas each primary frequency has but a single modulation point of application. The frequencies indicated below each filter block are the cut-off frequencies of the respective filters. The symbols within the filter blocks are idealized attenuation frequency characteristic curves.

The system of frequency tracking in accordance with the principles of this invention is not limited to systems in which the master frequency is fixed as described in regard to FIGS. 6A and 6B, but may also be applied to systems in which the frequency of the master signal source is variable.

In most high-precision alternating-current signal sources covering wire adjustable frequency ranges, and known in the art as heterodyne oscillators, the output signal frequency is derived as a difference between two high-level carrier frequencies, one of which is fixed and the other variable over a fixed range. If it is desired to track the output of such a heterodyne or beat frequency oscillator at some constant frequency difference, a slave frequency at this constant difference frequency can be provided by my system. Let it be assumed that a heterodyne oscillator providing an adjustable frequency output over the range of 50 to 3600 kilocycles per second is to be tracked with a slave oscillator of variable frequency in the 81 to 3631 kilocycle per second range. A tracking difference frequency of $f_0$=31,000 cycles per second is therefore required. Let it be further assumed that (*a*) the output of the heterodyne oscillator itself is derived from a fixed frequency oscillator generating 15,000 kilocycles per second and a variable frequency oscillator in the range of 11,400 to 14,950 kilocycles per second; and that (*b*) the outputs of certain of the afore-noted oscillators are available at external terminals thereof for the purpose mentioned below. Then, the output of the fixed oscillator can be used as a primary frequency $f_k$=15,000 kilocycles per second and the output of the variable oscillator can be combined with the resultant of the tracking frequency $f_0$=31,000 cycles per second and $f_k$ to produce the desired slave frequency output. Heterodyne oscillators of the type mentioned here are well known in the art, as disclosed in the patent of D. A. Alsberg et al. No. 2,622,127, issued December 16, 1952, and are further discussed below in regard to FIGS. 7A and 7B.

Figure 7A:
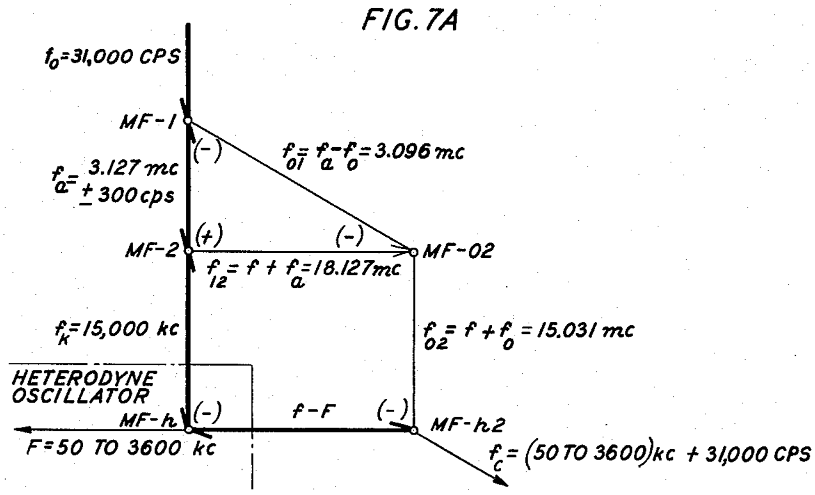
FIGS. 7A and 7B are symbolic and block diagrams, respectively, of a practical frequency tracking system for an adjustable heterodyne oscillator in accordance with the invention.
Figure 7B:
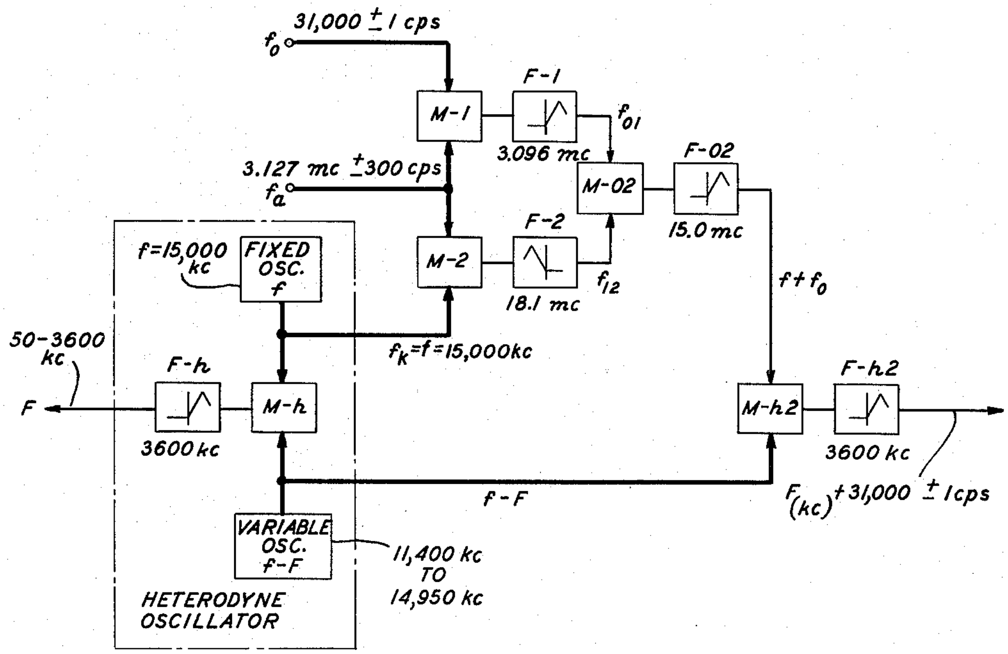
Figure 8A:
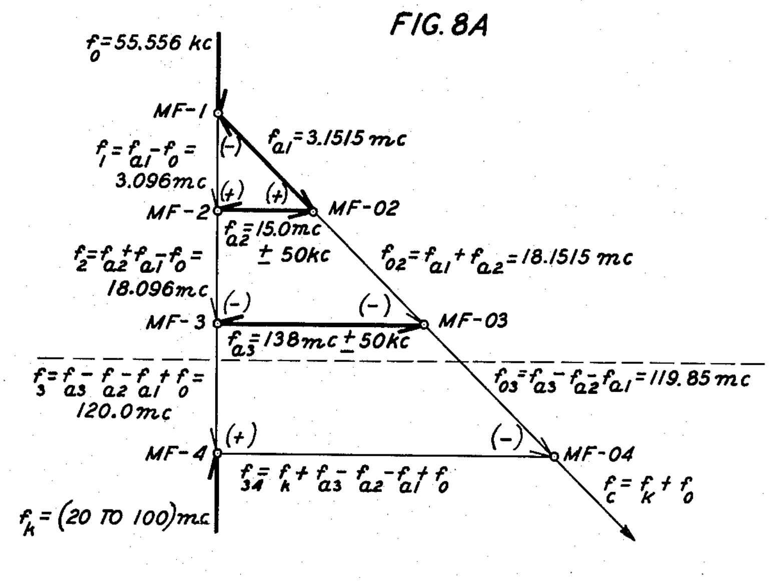
FIGS. 8A and 8B are symbolic and block diagrams, respectively, of a practical frequency tracking system in accordance with the invention in which the master frequency signal is adjustable over a wide frequency range.
Figure 8B:
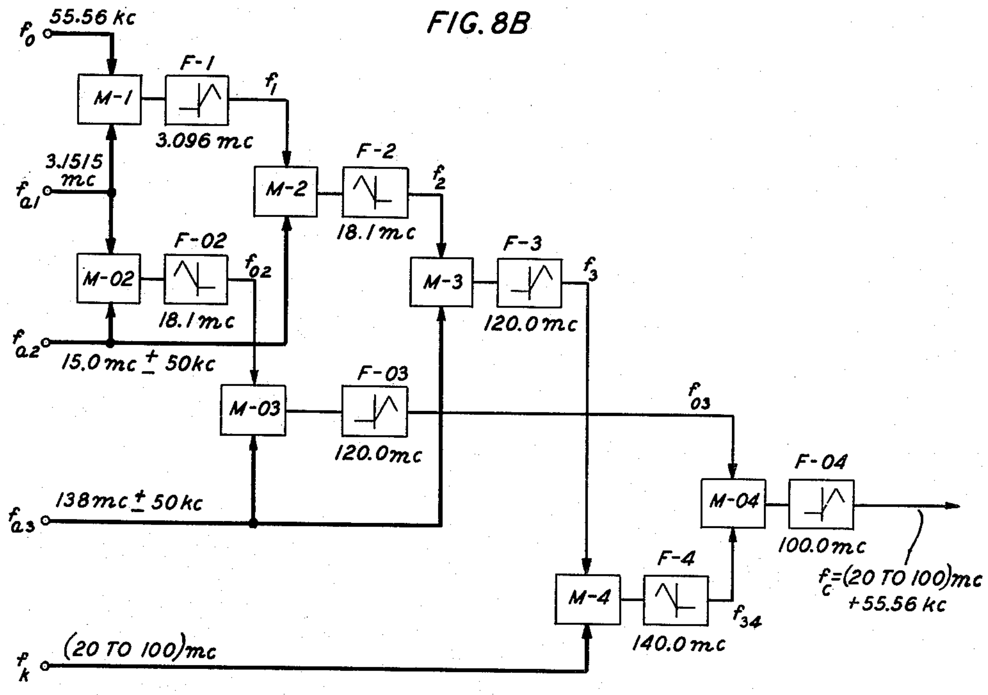

FIG. 7A is the symbolic diagram for such a heterodyne system, and FIG. 7B is the corresponding block diagram in which identical reference designations are used on both figures to represent the same structural element. A *k*-factor of 2 is used for the system. The constant difference frequency of 31,000 cycles becomes $f_0$. One auxiliary frequency $f_a$=3,127 megacycles±300 cycles is used between junction-points MF–1 and MF–2. The difference frequency $f_{01}$=3.096 megacycles per second between the auxiliary frequency $f_a$ and the difference frequency $f_0$ is selected at junction-point MF–1 and at point MF–2 the upper sideband $f_{12}$=18.127 megacycles per second of auxiliary frequency $f_a$ and the fixed oscillator frequency $f$=15,000 kilocycles per second is selected. The two resultant frequencies $f_{01}$ and $f_{12}$ are combined at junction-point MF–02 and the upper sideband $f_{02}$=15,031 kilocycles per second is obtained. It may be noted that the fixed frequency portion of the symbolic diagram of FIG. 7A corresponds to mode A–4 of Table 1 presented above. The frequency $f_{02}$ is then combined with the output of the variable frequency oscillator and the lower sideband of these two frequencies is selected to obtain the desired output of 81,000 to 3,631,000 cycles per second. The junction-point MF–*h* is part of the heterodyne oscillator itself and the filter used therein may be duplicated to serve at the slave output junction-point MF–*h*2. Thus, the master frequency is available at the normal output of the heterodyne oscillator and the slave output is available at the junction-point MF–*h*2. The precision of the slave frequency output is determined by the heterodyne oscillator and the difference frequency of 31,000 cycles per second. The symbolic diagram FIG. 7A may be translated readily in accordance with the principles discussed above in connection with FIGS. 1A, 1B and 2B into the block diagram FIG. 7B which shows the filter characteristics required at each modulator-filter combining point.

Where the internal connections of an alternating-current signal source adjustable over a wide range are not available for the uses described in connection with FIGS. 7A and 7B above, it is still possible to track such a source with a constant difference frequency using the principles of this invention. Assume the master frequency source $f_k$ covers a range of 20 to 100 megacycles and a slave signal $f_c$ is required which is higher than the master frequency by a difference frequency $f_0$=55.556 kilocycles. The solution to this problem is arrived at in two steps as indicated in the diagrams of FIGS. 8A and 8B. Above the horizontal dashed line in the symbolic diagram shown in FIG. 8A all frequencies are fixed. The first step is to establish the frequencies to be employed in this section of the diagram. The minimum fixed frequency $f_3$ must be determined so that $$\frac{f_3}{f_3-f_{max\ 34}} \leq n \qquad (13)$$

where $f_{max.\ 34}$=the maximum value of the master oscillator frequency; and $n$=the highest ratio between frequencies to be combined as in Equation 1.

Equation 13 may be rearranged as follows:

$$f_3=\frac{n}{n-1} f_{max\ 34} \qquad (14)$$

From Equation 14 $f_3$ is obtained as 120 megacycles, assuming an *n*-value of 6. Taking the ratio of this frequency and the difference frequency, a *k*-factor of 3 is arrived at, and a symbolic diagram shown in the upper part of FIG. 8A is obtained. The second step involves the addition of two more modulator-filter elements at MF–4 and MF–04 located below the dashed line. These elements must handle the variable frequencies in the system. The corresponding block diagram shown in FIG. 8B is derived by inspection by one skilled in the art in the light of the previous detailed discussion of FIGS. 1A, 1B and 2B from the symbolic diagram of FIG. 8A. It is seen that three auxiliary frequencies and five different filter designs are employed. All filters are, however, fixed and need no adjustment after connection in the circuit. The only adjustable part of the system is the master frequency signal source. No feedback loops are necessary. The precision and stability of the slave source is that of the master frequency source itself.

The foregoing examples of the application of the principles of my invention relating to frequency tracking systems are intended to be illustrative only. Many other systems, including, for example, the combining of two high ratio frequencies of the order of 10,000 to 1 or more, can be devised by those skilled in the art within the spirit and scope of the invention.

What is claimed is:

1. A system for generating a slave frequency signal which precisely tracks a fixed master frequency signal subject to random frequency deviations by a constant predetermined difference frequency comprising; a master frequency signal source, a source of said difference frequency, first and second auxiliary frequency sources, each generating a frequency intermediate the frequencies of said master source and said difference source, first, second, third, fourth and fifth modulators, each of said modulators having an output and two input points, means for connecting said difference frequency source to an input of said first modulator, means for connecting said master source to an input of said third modulator, means for connecting said first auxiliary source to an input of each of said first and fourth modulators, means for connecting said second auxiliary source to an input of each of said third and fifth modulators, a first network connected to the output of said first modulator for selecting the lower sideband of said first auxiliary frequency and said difference frequency, a third network connected to the output of said third modulator for selecting the lower sideband of said master frequency and said second auxiliary frequency, means for connecting the outputs of said first and third networks to the inputs of said second modulator, a second network connected to the output of said second modulator for selecting the lower sideband of the outputs from said first and third networks, means for connecting the output of said second modulator to the other input of said fourth modulator, a fourth network connected to the output of said fourth modulator for selecting the upper sideband of the outputs of said second network and said first auxiliary frequency source, means for connecting the outputs of said fourth modulator to the other input of said fifth modulator, and a fifth network connected to the output of said fifth modulator for selecting the upper sideband of the second auxiliary frequency and the output of said fourth network, said last-mentioned sideband being the desired slave frequency output.

2. A system for generating a slave frequency signal which tracks a master frequency signal which is adjustable over a wide frequency range at a constant difference frequency, said master frequency signal being derived from a master source including a fixed frequency oscillator, a variable frequency oscillator, means for intermodulating the outputs of said fixed and variable frequency oscillators, and a frequency selective network for passing the difference frequency in the output of said intermodulating means, comprising a source of said constant difference frequency, an auxiliary source of frequency intermediate said last-mentioned difference frequency and the frequency of the fixed frequency oscillator of the master source, a first modulator, means for connecting said constant difference frequency and auxiliary sources to the inputs of said first modulator, first frequency selective means connected to the output of said first modulator for passing the lower sideband of the last-mentioned difference and auxiliary frequencies, a second modulator, means for connecting said auxiliary frequency source and said fixed frequency oscillator to the inputs of said second modulator, a second frequency selective network connected to the output of said second modulator for passing the upper sideband of the fixed and auxiliary frequencies, a third modulator, means for connecting the outputs of said first and second networks to the inputs of said third modulator, a third frequency selective network connected to the output of said third modulator for selecting the lower sideband of the outputs of said first and second networks, a fourth modulator, means for connecting the output of said third network to an input of said fourth modulator, means for connecting the variable frequency oscillator of said master source to the other input of said fourth modulator, and a fourth frequency selective network connected to the output of said fourth modulator for passing the lower sideband of the outputs of said third network and said variable frequency oscillator, said last-mentioned output being the desired slave frequency signal.

3. A frequency-tracking system for generating a slave frequency signal which tracks a master frequency signal source variable over a predetermined wide range by a constant difference frequency comprising a source of said difference frequency, first, second and third auxiliary sources of frequencies progressively higher than said difference frequency, said third auxiliary frequency being higher than the maximum frequency to which said master source can be adjusted, a plurality of modulator-fixed filter elements each of which includes an output and two input points and each filter portion is adapted to pass only one chosen sideband of two frequencies applied to the input points, means for connecting said difference frequency and said first auxiliary frequency sources to the input points of a first of said modulator filter elements, the filter portion of the first of said elements selecting the lower sideband of the two input frequencies, means for connecting said first and second auxiliary sources to the input points of a second of said modulator-filter elements, the filter portion thereof selecting the upper sideband of the two input frequencies, means for connecting the output of said first element and second auxiliary source to a third of said modulator-filter elements, the filter portion thereof selecting the upper sideband of the two input frequencies, means for connecting the output of said second element and the highest frequency auxiliary source to a fourth of said modulator-filter elements, the filter portion thereof selecting the lower sideband of the two input frequencies, means for connecting the output of said third element and the highest-frequency auxiliary source to the input points of a fifth of said modulator-filter elements, the filter portion thereof selecting the lower sideband of the two input frequencies, means for connecting the output of said fifth element and said master source to the inputs of a sixth of said modulator-filter elements, the filter portion thereof selecting the upper sideband of the two input frequencies, and means for connecting the outputs of said fourth and sixth elements to the input points of a seventh of said modulator-filter elements, the filter element thereof selecting the lower sideband of the two input frequencies, said last-mentioned sideband being the desired slave frequency signal.

References Cited in the file of this patent

UNITED STATES PATENTS

| | | |
|---|---|---|
| 2,247,544 | Daily | July 1, 1941 |
| 2,406,932 | Tunick | Sept. 3, 1946 |
| 2,582,768 | Colas | Jan. 15, 1952 |
| 2,745,962 | Wojciechowski | May 15, 1956 |
| 2,781,450 | Ianouchewsky | Feb. 12, 1957 |

FOREIGN PATENTS

| | | |
|---|---|---|
| 714,684 | Great Britain | Sept. 1, 1954 |